H. Miller,
Bird House.
No. 102,573.　　　　Patented May. 3. 1870.
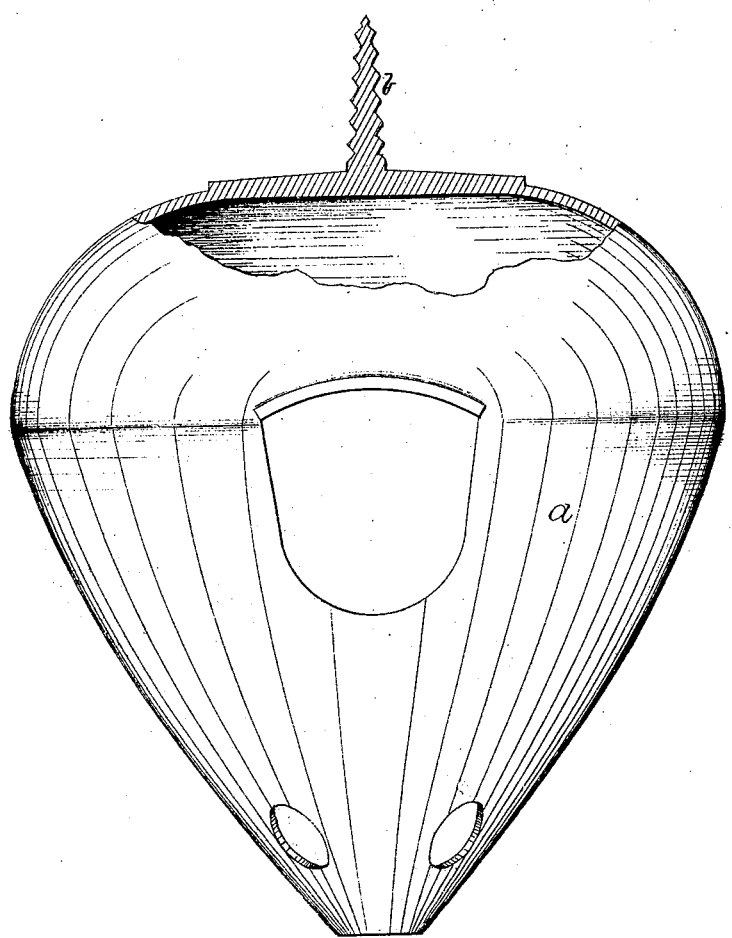
Witnesses　　　　　　　Inventor
M. E. Oston Esq.　　　　Henry Miller by
C. O. Brown　　　　　　Geo. E. Brown Atty

United States Patent Office.

HENRY MILLER, OF JOHNSTON, RHODE ISLAND.

Letters Patent No. 102,573, dated May 3, 1870.

IMPROVEMENT IN BIRD-HOUSE.

The Schedule referred to in these Letters Patent and making part of the same.

*To all whom it may concern:*

Be it known that I, HENRY MILLER, of Johnston, in the State of Rhode Island, have invented a new and useful Improvement in Bird-Houses; and I do hereby declare that the following is a full, clear, and exact description of the same, reference being had to the accompanying drawings and letters of reference marked thereon making a part of this specification, in which—

Figure 1 is a sectional elevation.

This invention is an improvement on the one patented by me April 14, 1868. That patent relates to a bird-house constructed in sections, which are bound together by a vertical bolt passing lengthwise of the structure, and fastening it to the top of the sustaining-pole.

To enable those skilled in the art to make and use my invention, I now proceed to describe its construction and operation.

Similar letters in the drawings refer to like parts.

The improvement consists is casting solid with the house a tapering screw projecting upward from its top.

As these houses are designed more particularly for the accommodation of the English sparrow, it is desirable that they should be attached in numbers to the limbs of trees, that the birds may lodge in communities, according to their habit. Hence the provision of the screw by which the house may be readily attached to the branches.

In the drawing— a is the house, and b, the screw.

I claim as my invention—

The bird-house a, provided with the tapering screw b, in the manner described and for the purpose set forth.

HENRY MILLER.

Witnesses:
 GEORGE MILLER,
 ROBERT WILSON.